United States Patent
Raghunandan

(10) Patent No.: US 6,944,591 B1
(45) Date of Patent: Sep. 13, 2005

(54) AUDIO SUPPORT SYSTEM FOR CONTROLLING AN E-MAIL SYSTEM IN A REMOTE COMPUTER

(75) Inventor: Hulikunta Prahlad Raghunandan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 09/626,945

(22) Filed: Jul. 27, 2000

(51) Int. Cl.[7] .................. G10L 13/00; G10L 15/26; H04M 1/652
(52) U.S. Cl. .................. 704/235; 704/260; 379/88.04; 379/88.16
(58) Field of Search ............... 704/235, 260, 704/270, 270.1, 275; 379/88.01, 88.03, 88.04, 379/88.16, 88.22, 88.23

(56) References Cited

U.S. PATENT DOCUMENTS

| | | | |
|---|---|---|---|
| 5,231,670 A | | 7/1993 | Goldhor et al. |
| 5,444,768 A | * | 8/1995 | Lemaire et al. .............. 379/68 |
| 5,696,879 A | * | 12/1997 | Cline et al. .................. 704/260 |
| 5,724,410 A | | 3/1998 | Parvulescu et al. |
| 5,884,262 A | * | 3/1999 | Wise et al. .............. 704/270.1 |
| 5,933,805 A | * | 8/1999 | Boss et al. .................. 704/249 |
| 5,995,590 A | * | 11/1999 | Brunet et al. .................. 379/52 |
| 6,061,718 A | | 5/2000 | Nelson |
| 6,173,250 B1 | * | 1/2001 | Jong ............................. 704/3 |
| 6,216,104 B1 | * | 4/2001 | Moshfeghi et al. ......... 704/260 |
| 6,408,272 B1 | * | 6/2002 | White et al. .............. 704/270.1 |
| 6,507,643 B1 | * | 1/2003 | Groner .................... 379/88.14 |
| 6,526,381 B1 | * | 2/2003 | Wilson ....................... 704/251 |
| 6,539,358 B1 | * | 3/2003 | Coon et al. ................. 704/275 |
| 6,584,181 B1 | * | 6/2003 | Aktas et al. ............. 379/88.23 |
| 6,614,890 B2 | * | 9/2003 | Perlman et al. .......... 379/93.24 |
| 6,775,651 B1 | * | 8/2004 | Lewis et al. ................ 704/235 |
| 6,792,082 B1 | * | 9/2004 | Levine ...................... 379/67.1 |
| 6,801,931 B1 | * | 10/2004 | Ramesh et al. ............. 709/206 |
| 6,807,565 B1 | * | 10/2004 | Dodrill et al. .............. 709/206 |
| 6,813,603 B1 | * | 11/2004 | Groner et al. .............. 704/235 |
| 6,829,334 B1 | * | 12/2004 | Zirngibl et al. .......... 379/88.17 |
| 6,850,603 B1 | * | 2/2005 | Eberle et al. ............ 379/88.16 |
| 6,868,385 B1 | * | 3/2005 | Gerson ....................... 704/275 |
| 6,882,709 B1 | * | 4/2005 | Sherlock et al. ......... 379/90.01 |

* cited by examiner

*Primary Examiner*—Martin Lerner
(74) *Attorney, Agent, or Firm*—Anthony VS England; T. Rao Coca

(57) ABSTRACT

This invention relates to an apparatus, program product and a method for controlling an email system in a remote computer using a remote control device having an audio support, speech-to-text and text-to-speech facilities.

15 Claims, 4 Drawing Sheets

AUDIO SUPPORT SYSTEM FOR CONTROLLING AN E-MAIL SYSTEM IN A REMOTE COMPUTER

FIELD OF THE INVENTION

This invention relates to an audio support system for controlling an e-mail system in a remote computer.

BACKGROUND OF THE INVENTION

E-mail systems are becoming all pervasive as communication mechanisms, especially with the rapid increase in the use of computers and the internet. The existing e-mail systems provide a number of features to facilitate communication. However, these e-mail systems are not very friendly for people with disabilities, as these systems require the user to be in close proximity with the computer containing the e-mail system. It is desirable in situations involving people with disabilities to have a means for accessing the e-mail system remotely and in particular through a voice input mechanism.

The voice recognition systems are also known. These systems require the user to be physically proximal to the computer for operation.

U.S. Pat. No. 6,061,718 describes an e-mail delivery system for wireless communication system. However, this invention is limited to situations involving wireless transmissions over large distances using base stations. It is therefore targeted only at the mobile user segment and does not address the requirements of disabled users in a contained environment. Further more, this system does not enable the utilization of the full benefits and features available from an e-mail system when used directly on a computer.

Wireless Application Protocol (WAP) require Internet Service Provider (ISP), as an intermediary and are therefore limited. Further, such systems are useful only when communication is over a large distances and not in a contained environment.

THE OBJECTS AND SUMMARY OF THE INVENTION

The object of the present invention is to overcome the above mentioned drawbacks and provide a system for remote access to e-mail facilities in a computer system through an audio support mechanism.

To achieve the said objective, this invention provides a computing system consisting of a central processing unit, associated memory, input/output devices and containing an e-mail system which is characterized in that it includes a remote control device comprising:
  means to convert speech to text;
  means to transmit the said text to the said e-mail system;
  means to receive text from the said e-mail system;
  means to convert the received text into speech; and
  means to select and access the received e-mail in the said e-mail system.

The said remote control device (RCD) includes a means to display the received email messages.

The said remote control device is customized by the user to speak aloud the sender, date, subject, e-mail content and attachment (if required) for incoming mail.

The said remote control device (RCD) includes means for selecting email messages or folder.

The said remote control device includes means for speaking aloud the summary of an e-mail folder.

The said remote control device is linked to the said computer through infra-red or ultrasonic or radio frequency waves.

The said e-mail system provides a speech announcement whenever new messages are received.

The said remote control device comprises:
  a microphone connected to the input of a microphone amplifier,
  the output of said microphone amplifier is connected to the input of an analog to digital converter (ADC),
  the output of the said ADC is connected to one input of a processor means,
  a second input of said processor means is connected to a Read Only Memory (ROM) containing text-to-speech conversion and speech-to-text conversion software,
  a first input-output of said processor means is connected to Random Access Memory (RAM) which contains the speech-to-text data, text-to-speech data, and command and status data,
  one output of said processor means is connected to a transmitter for transmitting the said data in RAM to a remote computer containing an e-mail system,
  another input of the said processor means is connected to a receiver which receives the data from said remote computer containing e-mail system,
  another input-output of the processor means is connected to a control panel containing switches and display elements,
  another output of the said processor means is connected to a digital to analog converter (DAC) which converts the data received after text-to-speech conversion into an analog signal and feeds to the input of an audio amplifier which drives a loud speaker to generate audible speech.

The said processor means is a digital signal processor, or a micro Controller or an ASIC.

The said ASIC includes the entire circuit except the microphone, speaker, computer containing e-mail system and control panel.

The said ASIC contains processing means ROM, RAM, transmitter and receiver.

This invention further relates to a computer program product residing on computer storage media containing computer readable devices embodied therein for causing a computer e-mail system to receive instructions and e-mail content from a remote control device and to send status and e-mail content to the said remote control device.

The said program product includes the facility for text-to-speech conversion.

This invention further includes a computing system consisting of a central processing unit, associated memory, input/output devices and containing an e-mail system, a method for remotely controlling the said e-mail system using an audio support comprising:
  sending e-mail by:
    receiving the speech input from the user,
    converting the speech input into the analog electrical signal,
    amplifying the said electrical signal and converting to digital form,
    converting the said digitized speech to text,
    transmitting the said text to the computer containing e-mail system,
    receiving the transmitted text in the computer containing e-mail system, transferring the said text to the said e-mail system, receiving e-mail by:
   transmission of data from computer containing e-mail system,
   receiving transmitted data at the remote control device,
   converting said received data from text to digitized speech,
   converting the said digitized speech to analog form,
   amplifying the said analog signal and converting to speech for the user.

The email is selected through speech or through control panel.

The received mail message is displayed on the said remote control device (RCD).

BRIEF DESCRIPTION OF THE DRAWINGS

This invention will now be described with reference to the accompanying drawings.

DETAILED DESCRIPTION OF THE INVENTION

Figure 1:
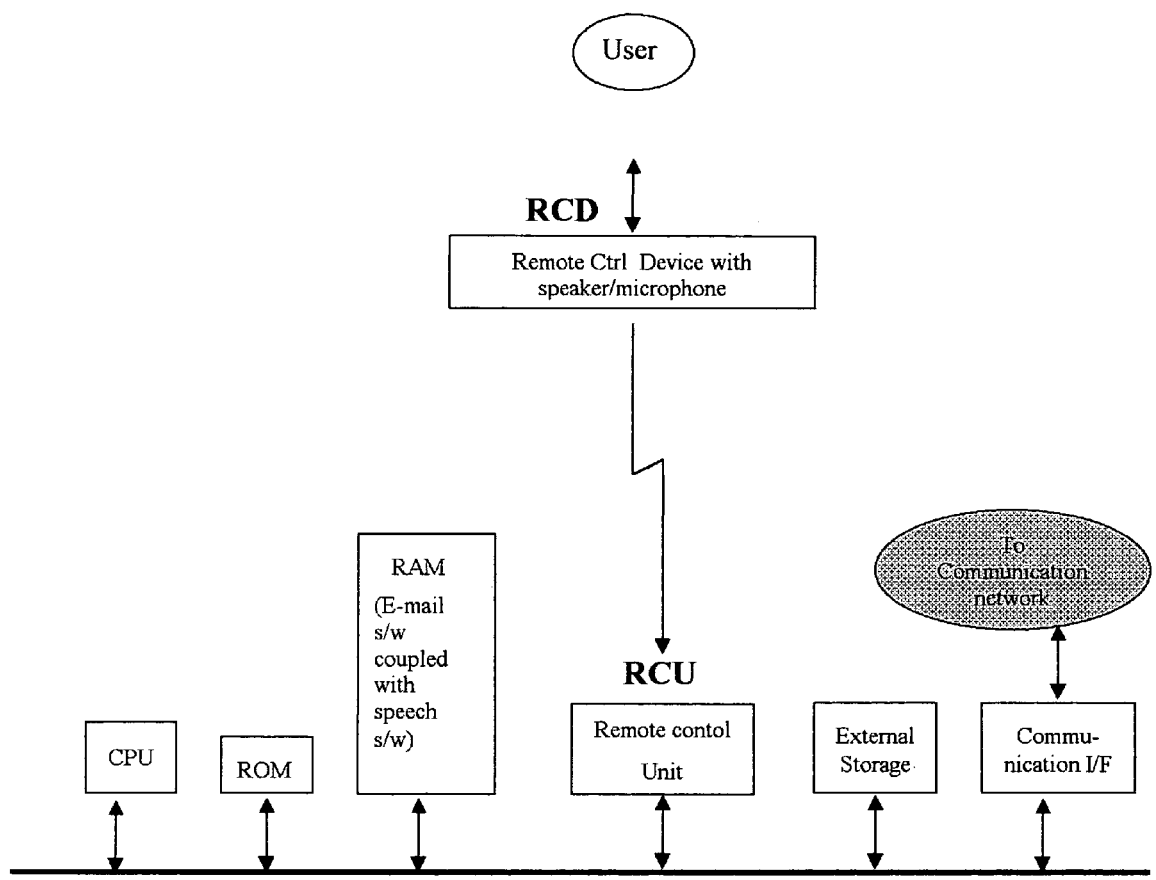
FIG. 1 shows the computing system having an e-mail system and remote control device and speaker-microphone according to this invention.

Referring to the drawings, FIG. 1 shows the computer containing an e-mail system and having a separate remote control device (RCD) with speaker-microphone and a corresponding remote control unit (RCU) in the computing system. The said remote control unit (RCU) receives the signals transmitted by the said remote control device (RCD) and passes to the CPU for processing. Similarly, it receives the signals from the CPU and transmits to the RCD.

Figure 2:
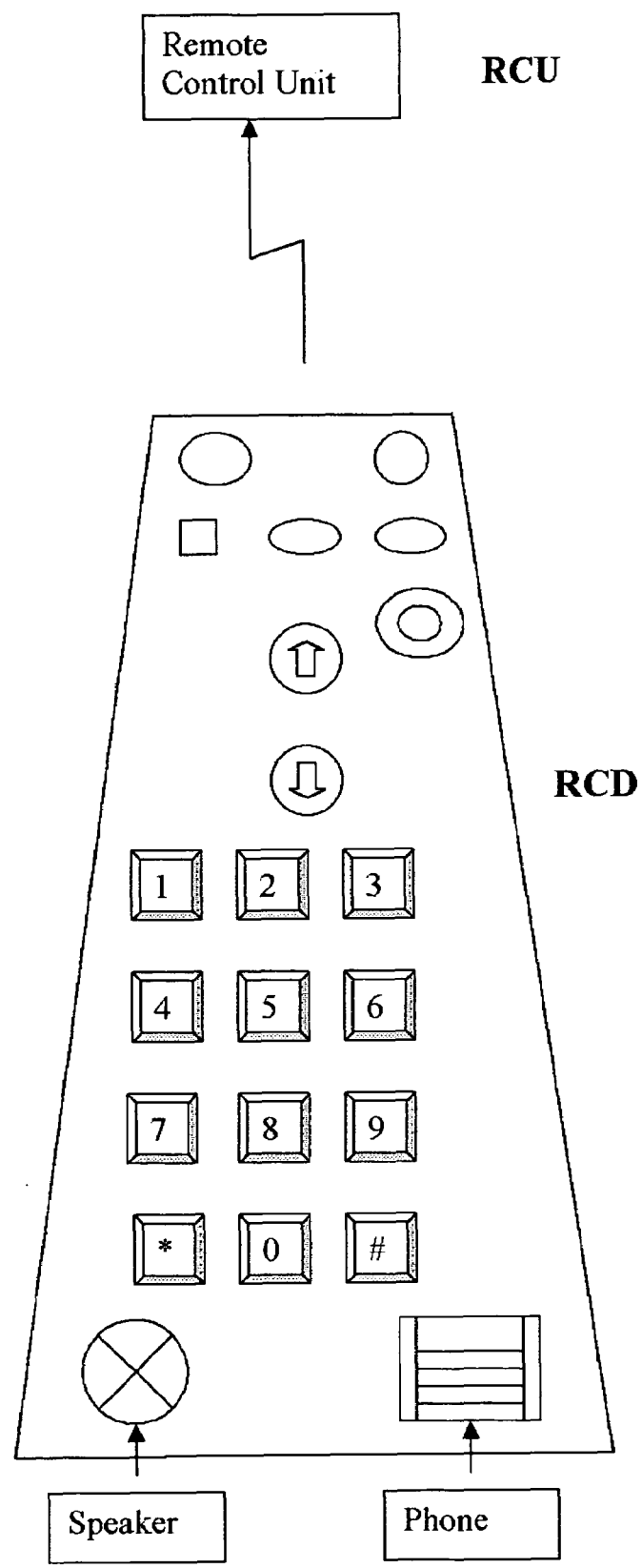
FIG. 2 shows the remote control device according to this invention.

FIG. 2 shows the remote control device (RCD) with its control panel.

Figure 3:
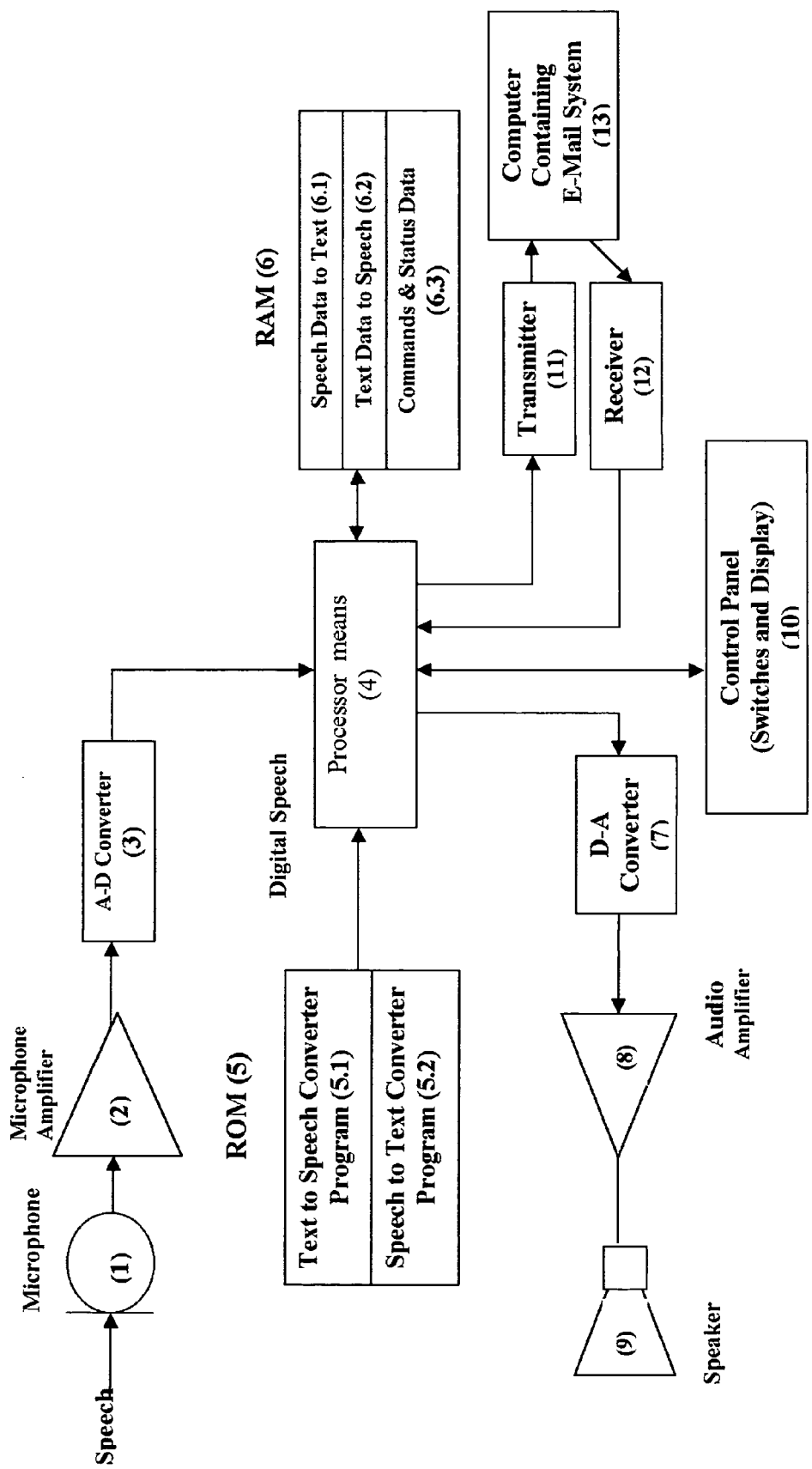
FIG. 3 shows the electronic circuit in the said remote control device.

FIG. 3 shows the electronic circuit of the said remote control device (RCD). The output of microphone (1) connects to the input of microphone amplifier (2) which supplies an amplified signal to A-D converter (3). The output of the said A to D converter (3) is connected to the processor means (4). The said processor means can be a "digital signal processor" (DSP) or a micro-controller or an ASIC. A first input of the said processor means is connected to ROM (5) containing text to speech conversion and speech to text conversion software (5.1 and 5.2 respectively). The one input-output of the said processor means is connected to RAM (6) which contains speech to text data (6.1, text to speech data 6.2 and commands and status data (6.3). A second input of the said processor means is connected to receiver (12) which receives data from the remote computer containing e-mail system. Another input-output of the said processor means is connected to the control panel containing switches and display (10). Another output of the processor means (4) connects to the input of D to A converter (7) which supplies analog signal to audio amplifier (8) which drives speaker (9) to produce audio output.

Figure 4:
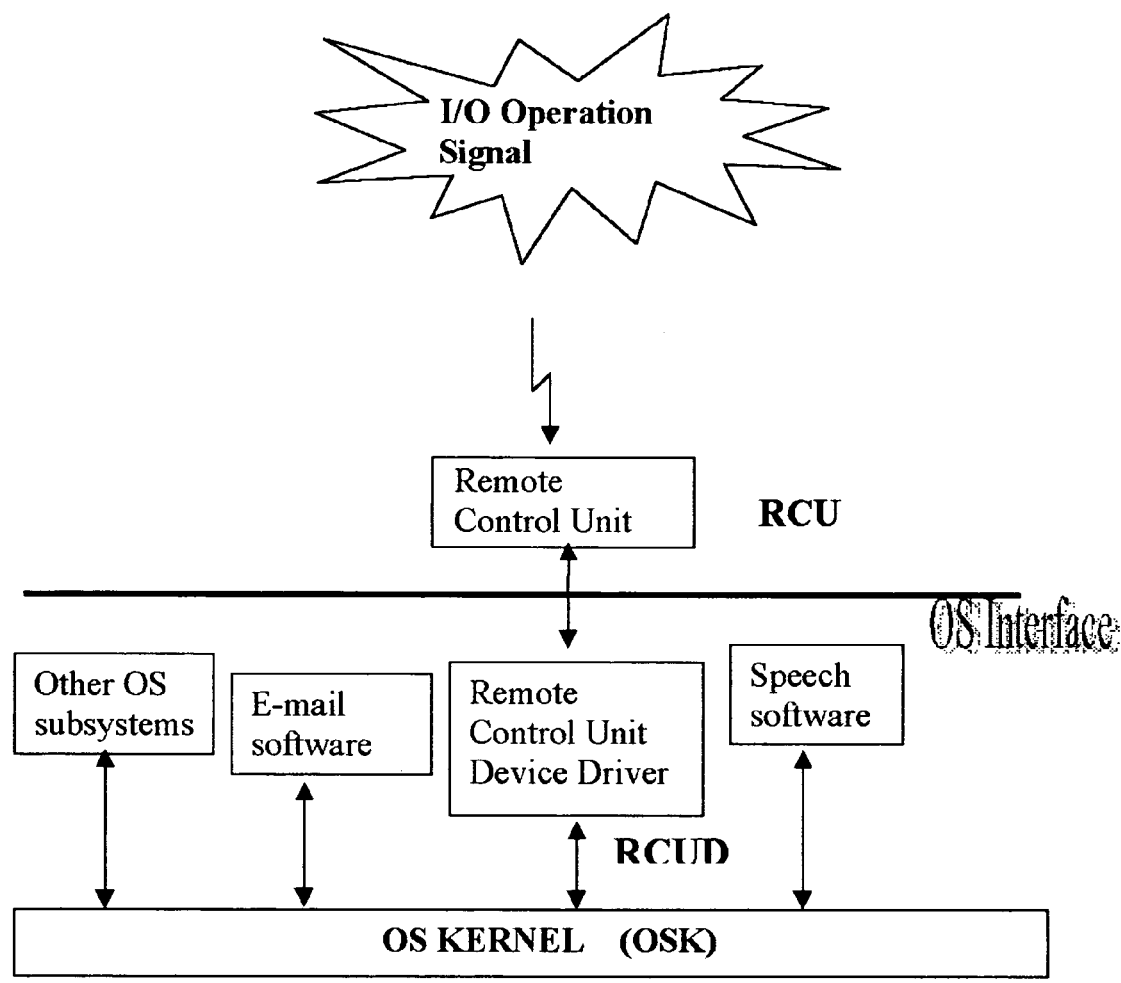
FIG. 4 shows the block diagram of the software elements used in this invention.

In FIG. 4 the remote control unit (RCU) resides in the computer system and interacts with the OS through Remote Control Unit Driver (RCUD). The RCU receives signals from the remote control device RCD and interacts with the OS Kernel which gives instructions to appropriate device and other sub-systems including the speech software and the e-mail software. The OS Kernel coordinates the transfer of the data from the e-mail system to the remote control unit device driver (RCUD). The RCUD operates the remote control unit (RCU) hardware to transmit and receive data to/from the distant hand held remote control device. The OS software is built in such a way that the drivers are supported by means of appropriate libraries with support function calls to such device.

The priority of the e-mail could be normal or urgent. An e-mail software could parse this information and provide the same to the user either by default or upon prompting. Another type of urgency information depends on e-mail contents. Here the user may be prompted for keywords or date and the e-mail software can parse/search the e-mails for keywords and/or dates and provide appropriate information.

Working of the Invention

User speech input is received by microphone (1), which converts the sound signals into electrical analog signals. These analog signals are amplified by microphone amplifier (2). The output from the microphone amplifier is converted by A-D converter (3) into digital signals. These digital signals are processed by processor means (4) using speech to text converter programme (5.2) contained in ROM (5) and converted to speech to text data (6.1) and stored in RAM (6). This data is then transmitted by transmitter (11) to the remote computer containing the e-mail system (13).

In the reverse process data transmitted by the e-mail system (13) is received by receiver (12) in the remote control device. The received data is processed by the processor means (4) using text to speech converter programme (5.1) contained in ROM (5) into text to speech data which is then stored in RAM (6). This data is further converted by D-A converter (7) into an analog signal which is applied to the input of audio amplifier (8) which drives speaker (9) to deliver output sound signals for the user.

Control panel (10) containing switches and display devices is operated by the user for providing commands to the system. The processor means (4) receives the commands from the control panel (10) stores as commands and status data (6.3) in the RAM (6) and transmits to the remote computer system through transmitter (11). It also receives status information from the remote e-mail system (13) through receiver (12) and displays on the control panel (10) for the user's information. The messages received from the remote computer can also be displayed on the remote control device (RCD). The control panel (10) typically includes switches for turning the remote control device on/off and buttons for incrementing or decrementing selected e-mail number, instructing for reading e-mail header information. It may further include buttons for instructing reading of e-mail content and number selection buttons for pointing to e-mail messages by number, starting accepting spoken instructions and buttons for interrupting a particular activity.

In the computer containing the e-mail system, the data from the Remote Control Device (RCD) is received by Remote Control Unit (RCU) which is operated by the Remote Control Unit Device Driver (RCUD) software. The RCUD software then interacts with the OS Kernel (OSK) which transfers the received data to the e-mail system. In like manner, data sent by the e-mail system is transferred to the RCUD through the (OSK). RCUD then operates the RCU to transmit the data to the RCD.

The invention will now be described with reference to the following examples:

EXAMPLE 1

Receive e-mail
Update e-mail count
Text to speech conversion
Announce sender, subject, count of e-mail, urgency information
Announce e-mail content if remote control device is used to instruct the same
Detach attachments and announce text part if prompted

EXAMPLE 2

User uses remote control device to point to latest unread e-mail
The user can provide instructions to announce sender, subject, count of e-mail, urgency information
The user can use the remote control device to point to the next unread e-mail and request similar information. Buttons on the remote control device enable this.

EXAMPLE 3

User uses the remote control to point to the appropriate mail, subject wise, sender wise or count wise.
The remote control prompts for the name of the sender or the text of the subject.
The user announces it aloud at the remote control device which has a facility to record voice.
The remote control device transmits this information to the device in the computer system where speech to text conversion occurs and the respective e-mail message is accessed.
The user wants to send a reply to an e-mail and indicates so by using the remote control device.
The remote control device prompts for sender, subject and content and attachment if any.
The user provides the same and instructs to send the e-mail.

ADVANTAGES

This type of e-mail support is useful in the following scenarios:
People with physical disabilities and who cannot move to or out of their work place very frequently.
People who are blind can also use this system if they are trained to use the remote control device.
This system will typically be most beneficial to reply/read short important messages. But is much better and more powerful than a cell phone or a pager. That is because one can get all the power of e-mail whereas in the case of a cell phone one can only send a message to one person.
While it may appear cumbersome or time consuming to expect a user to read e-mail content or attachment content, the facility is provided mainly to be used for short messages and for the sake of completion.
In workplaces like construction sites, mines etc. users can do very well with just a hand held device and access e-mail and reply to the same.
This invention can be used where there is no computer screen or monitor.

This invention is different from the solutions provided based on WAP because it does not require Internet Service Provider (ISP) facility the remote control device is similar to the television remote control and its range has a distance limitation.

I claim:

1. A computing system comprising a central processing unit, associated memory, input/output devices and containing an e-mail system, characterized in that the computer system includes a remote control device comprising:
    means to convert speech to text;
    means to transmit the text to the e-mail system;
    means to receive text from the e-mail system;
    means to convert the received text into speech; and
    means to select and access the received e-mail in the e-mail system,
    wherein said remote control device (RCD) further includes means to display the received email messages, and
    wherein the remote control device is customized by a user to speak aloud sender, date, subject, e-mail content and attachment for incoming mail.

2. A computing system as claimed in claim 1 wherein the remote control device includes means for selecting an email message or folder.

3. A computing system as claimed in claim 1, wherein the remote control device is linked to the computer through infra-red or ultrasonic or radio frequency waves.

4. A computing system comprising a central processing unit, associated memory, input/output devices and containing an e-mail system, characterized in that it includes a remote control device comprising:
    means to convert speech to text;
    means to transmit the text to the e-mail system;
    means to receive text from the e-mail system;
    means to convert the received text into speech; and
    means to select and access the received e-mail in the e-mail system,
    wherein the remote control device includes means for selecting email message or folder,
    wherein the remote control device includes means for speaking aloud a summary of an e-mail folder.

5. A computing system comprising a central processing unit, associated memory, input/output devices and containing an e-mail system, characterized in that it includes a remote control device comprising:
    means to convert speech to text;
    means to transmit the text to the e-mail system;
    means to receive text from the e-mail system;
    means to convert the received text into speech; and
    means to select and access the received e-mail in the e-mail system,
    wherein the remote control device is linked to the computer through infra-red or ultrasonic or radio frequency waves,
    wherein the e-mail system provides a audio announcement whenever new messages are received.

6. A computing system comprising a central processing unit, associated memory, input/output devices, an e-mail system and a remote control device, wherein the remote control device comprises:
    a microphone connected to an input of a microphone amplifier,
    an output of said microphone connected to an input of an analog to digital converter (ADC),
    an output of the ADC connected to one input of a processor, a second input of said processor connected to a ROM (Read Only Memory) containing text-to-speech conversion software and speech-to-text-conversion software, a first input-output of said processor connected to Random Access Memory (RAM) which contains speech-to-text data, text-to-speech-data, and command and status data, one output of said processor connected to a transmitter for transmitting the data in RAM to the e-mail system, another input of the processor connected to a receiver, wherein the receiver receives data from the e-mail system, another input/output of the processor connected to a control panel containing switches and display elements, and another output of the processor connected to a digital to analogue converter, wherein the digital to analogue converter converts data received from the text-to-speech conversion software into an analogue electrical signal, the analogue electrical signal being fed to an input of an audio amplifier which drives a loud speaker to generate audible sound.

7. A computing system as claimed in claim 6 wherein the processor is a digital signal processor.

8. A computing system as claimed in claim 6 wherein the processor is a micro controller.

9. A computing system as claimed in claim 6 wherein the processor is an ASIC.

10. A computing system as claimed in claim 9 wherein the ASIC includes the entire circuit except the microphone, speaker, computer containing e-mail system and control panel.

11. A computing system as claimed in claim 9 wherein the ASIC contains ROM, RAM, transmitter and receiver.

12. A computer programme product residing on computer storage media, the computer programme product comprising:

instructions for sending e-mail by:
  receiving speech input by a remote control device from a user,
  converting the speech input by the remote control device into an analog electrical signal,
  amplifying the electrical signal and converting the electrical signal to digital form by the remote control device,
  converting the digitized signal to text by the remote control device, and
  transmitting the text by the remote control device to an e-mail system of a computing system, instructions for receiving e-mail by:
    transmission of data to the remote control device,
    receiving data from the computing system's e-mail system by the remote control device,
    converting said received data from text to digitized speech by the remote control device,
    converting the digitized speech to analog form by the remote control device, and
    amplifying the analog signal and converting the analog signal to speech by the remote control device for the user.

13. In a computing system comprising a central processing unit, associated memory, input/output devices and an e-mail system, a method for remotely controlling the e-mail system using a remote control device, the method comprising the steps of:

sending e-mail by:
  receiving speech input by the remote control device from a user,
  converting the speech input by the remote control device into an analog electrical signal,
  amplifying the electrical signal and converting the electrical signal to digital form by the remote control device,
  converting the digitized signal to text by the remote control device,
  transmitting the text by the remote control device to the computing system's e-mail system, and
  receiving the transmitted text in the computing system's e-mail system, and
receiving e-mail by:
  transmission of data from the computing system's e-mail system to the remote control device,
  receiving transmitted data at the remote control device,
  converting said received data from text to digitized speech by the remote control device,
  converting the digitized speech to analog form by the remote control device, and
  amplifying the analog signal and converting the analog signal to speech by the remote control device for the user.

14. A method as claimed in claim 13 wherein the email is selected through speech or through a control panel.

15. A method as claimed in claim 13 wherein the received mail message is displayed on the remote control device.

* * * * *